United States Patent [19]

Carroll

[11] 4,006,731
[45] Feb. 8, 1977

[54] BUILDING DECK CONSTRUCTION

[75] Inventor: Frank E. Carroll, Barrington, Ill.

[73] Assignee: Decks, Incorporated, Rolling Meadows, Ill.

[22] Filed: Nov. 10, 1975

[21] Appl. No.: 630,504

Related U.S. Application Data

[63] Continuation-in-part of Ser. No. 515,872, Oct. 18, 1974, Pat. No. 3,918,230.

[52] U.S. Cl. .............................. 126/271; 52/309.8
[51] Int. Cl.$^2$ .......................................... F24J 3/02
[58] Field of Search ............ 52/168, 173, 309, 335, 52/336, 327, 328, 329, 333, 357, 351, 451, 411, 412, 405, 410; 126/271, 270; 237/1 A

[56] References Cited

UNITED STATES PATENTS

| | | | |
|---|---|---|---|
| 3,893,506 | 7/1975 | Laing | 126/271 X |
| 3,937,208 | 2/1976 | Katz et al. | 126/271 |

Primary Examiner—William F. O'Dea
Assistant Examiner—Rober J. Charvat
Attorney, Agent, or Firm—Thomas W. Speckman

[57] ABSTRACT

A building deck structure having sheet metal structural shapes of a box section as sub-purlins, the upper face of the box section having open slots for engaging sheet metal clips which are secured in the box section when the axis of the clip and the box section are about 90° to each other, the clip engaging and holding a formboard-insulation assembly adjacent the top face of the box section and providing a bearing surface for deck supporting shapes for attachment of sheet polymeric structural weather surface to provide uplift resistance to the composite structure. The deck structure of this invention is extremely versatile providing a very economical insulating deck structure which is particularly suited to solar energy absorption and skylights over large areas. The combination structure of this invention permits the use of thinner formboard and lightweight plastic structural weather surface, providing lighter weight insulated and solar energy absorbing decks than previously available.

10 Claims, 5 Drawing Figures

BUILDING DECK CONSTRUCTION

CROSS REFERENCE TO RELATED APPLICATION

This is a continuation-in-part application of copending application, Ser. No. 515,892, filed Oct. 18, 1974, to issue as U.S. Pat. No. 3,918,230, Nov. 11, 1975.

This invention relates to building deck construction which is especially suited for synthetic polmeric sheet structural roof decks. The deck construction of this invention utilizes sub-purlins formed from sheet metal and clips formed from sheet metal to provide a deck construction system which is extremely versatile. The deck structures of this invention utilize formboard with insulating material to exterior and a structural synthetic polymeric sheet to the exterior of the formboard and insulation. The rigid formboard is laid on the sheet metal structural shape sub-purlin and held in place by the sheet metal clips. The sheet metal clips further provide uplift resistance to the composite structure. The deck construction of this invention also provides for insulated decks of varying insulation capabilities and further provides for solar energy collecting roof construction. Utilization of the sheet metal sub-purlins in the deck construction of this invention allows various spacings of the sub-purlins and accommodation of various thicknesses and sizes of the formboard.

The sheet metal sub-purlin shapes utilized in this invention have previously been used with similar sheet metal clips for holding tongue and groove precast deck planks such as sold under the trademark TECTUM by National Gypsum Company. Such prior roofs have conventional built-up, non-structural weather surfaces of roofing paper and tar which do not provide any composite structural action, especially uplift resistance. However, the utilization of a similar sub-purlin and sheet metal clip has not been recognized as advantageous in structural plastic sheet or solar energy collecting roof deck construction. Previously available corrugated sheets of synthetic materials, principally glass fiber reinforced polyester and polyvinyl chloride, were not satisfactory as structural roof decks due to poor impact strength and degradation by ultraviolet radiation. These difficulties have, to a large degree, been overcome by the development of biaxially oriented polyvinyl chloride which is suitable for use as a structural roof deck outer surface material.

The deck construction of this invention provides a method of construction in which the sub-purlin is flat on top and is totally beneath the sheet deck structure, thus, providing a framework in which the sub-purlins may be placed at any desired spacing to obtain various strength characteristics and the sheet deck structure is placed on top of the flat upper surface of the sub-purlin. Uplift resistance is obtained by the sheet metal clips holding the formboard and insulation against the flat upper surface of the sub-purlin and fastening the synthetic polymer exterior surface material to structural shapes which are fastened to the sheet metal clips, thus obtaining a composite structure.

It is an object of this invention to overcome the above disadvantages of prior deck construction.

It is another object of this invention to provide deck construction utilizing sheet metal sub-purlins which are totally beneath the sheet deck structure and sheet metal clips which readily attach to the sheet metal sub-purlins and hold the entire upper sheet structures to provide excellent uplift resistance.

It is a further object of this invention to provide deck systems which are extremely flexible with respect to sub-purlin spacing to obtain a wide range of strength characteristics.

It is still another object of this invention to provide an economical, insulating and exterior synthetic polymer sheet roof deck system.

It is another object of this invention to provide a roof deck structure which is especially suitable for use as a solar energy collecting roof deck system.

These and other objects, advantages and features of this invention will be apparent from the description and by reference to the drawings wherein preferred embodiments are shown as:

The sheet metal structural shape utilized in this invention provides excellent structural characteristics while reducing weight and providing a structural shape that can be readily fabricated from sheet metal. It is highly desirable to fabricate structural shapes from sheet metal to minimize energy requirements in production and to conserve steel. Prior attempts to utilize sheet metal shapes in deck construction have not been entirely satisfactory. Some prior attempts have utilized sheet metal shapes as substitutes for bulb tees in roof deck construction. Some of these sheet metal shapes while providing sufficient strength in the composite assembled poured roof, do not have satisfactory strength characteristics themselves and in the erection bend over or roll when walked upon by the erectors. This results in very dangerous working conditions for workers.

The sheet metal structural shapes utilized in this invention provide desirable strength characteristics themselves and sufficient strength characteristics to be walked upon during erection without dangerous bending or rolling. Further, the sheet metal sub-purlins utilized in the deck construction of this invention provide a flat upper surface upon which the base material for the deck construction may be laid. Prior sub-purlins utilized in deck construction, have sometimes extended into the roof deck structure and thus the spacing of the sub-purlins has been governed by the width of formboard or rigid board material laid between them. In the deck construction of this invention, the rigid board, such as formboard, is laid on top of the sub-purlin and thus, the sub-purlins may be utilized in closer spacing allowing thinner formboards, insulation and structural sheet decks to be placed on top of the closer spaced sub-purlin structure. The deck construction of this invention allows the use of any width or length board to be placed upon the top surface of any desired spacing of sub-purlins.

Figure 1:
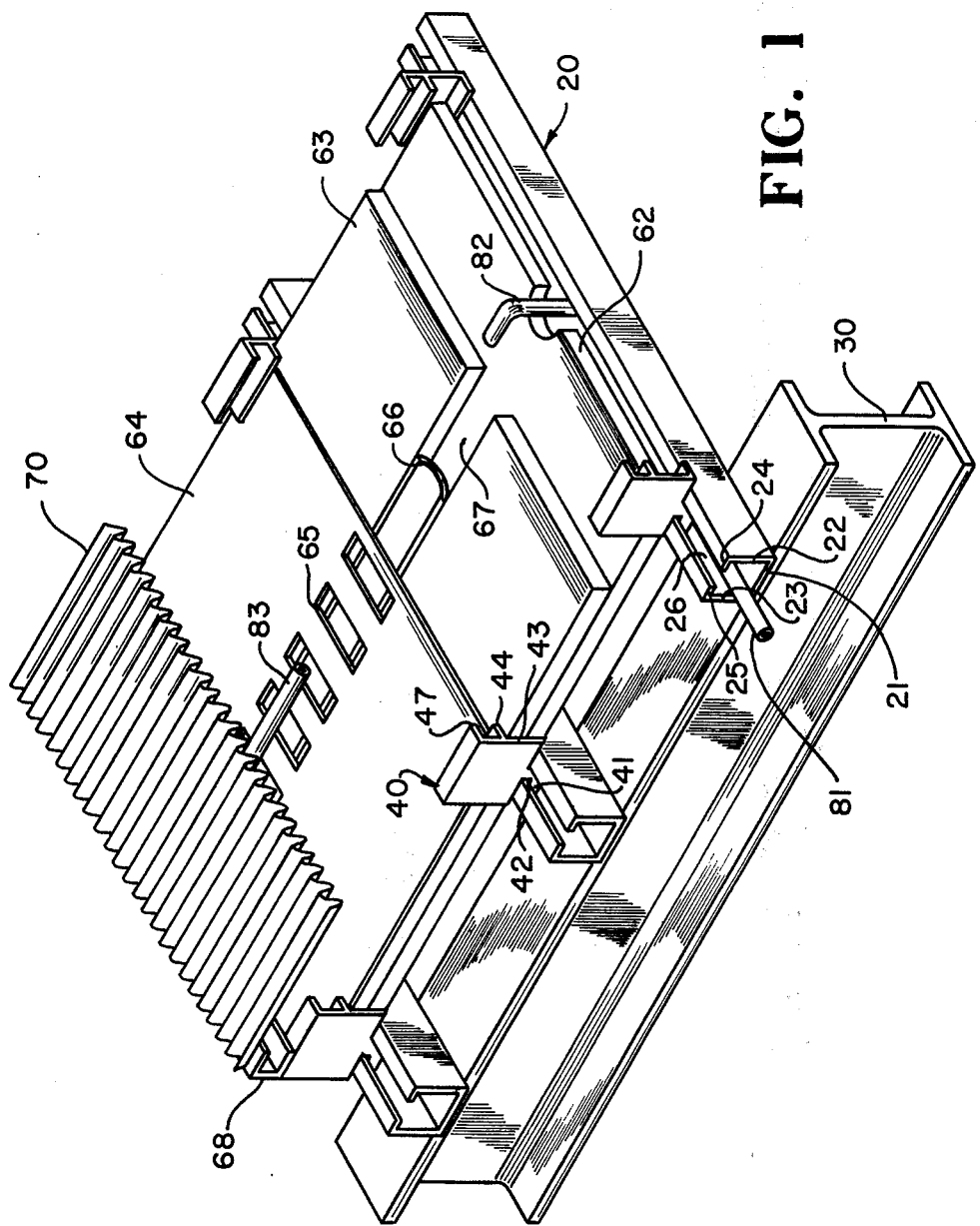
FIG. 1 is a perspective cutaway view of a roof deck construction according to one embodiment of this invention.

Referring to FIG. 1, the sheet metal shape utilized in this invention is shown as box section 20 having a lower horizontal base 21 resting upon purlin structure 30, vertical sides 22 and 23 and upper horizontal flanges 24 and 25. Slot 26 between the terminal ends of flanges 24 and 25 is preferred to be continuous to permit the most flexible use of the sheet metal box section. However, it is understood that slot 26 may be discontinuous and flanges 24 and 25 joining to enclose the top of the box section where it is not necessary to utilize the sheet metal clips.

The sheet metal box sections may be fabricated by well known roll forming techniques from sheet metal from about 20 gauge to about 14 gauge. It is preferred to use galvanized, commercial grade steel of 16 and 18 gauge.

The depth of the box section to be used as a sub-purlin may be about 2 inches to about 3 inches, preferably about 2¼38 inches to about 2½ inches. The width of the box section may be about 1½ inch to about 2½ inches, preferably about 1¾ inch to about 2 inches. The slot for receiving the sheet metal clip may be any width to suit the clip section. Slots about ⅜ inch to about ¾ inch are suitable, about ⅝ inch being preferred. It should be recognized that the above dimensions are governed only be conventionally desired strength characteristics of described uses as sub-purlins and may be outside the above ranges to obtain out-of-the ordinary requirements.

The sheet metal clip is shown as 40 having opposing slots 42 between vertical portions 41 and 43 which engage flanges 24 and 25 of the sheet metal box section so that when the axis of the clip is 90° with the axis of the box section, the clip is anchored with the opposing flanges of the top of the box section engaging slots 42 with vertical portion 41 being within the box section. Vertical portion 43 of the sheet metal clip extends upward from the top of the box section a suitable height to provide horizontal portion 44, providing snug fitting of desired rigid board such as formboard 62, polymeric insulation 63 and, if desired, solar energy absorber 64, between horizontal portion 44 and the top flanges 24 and 25 of the sheet metal box section. Horizontal portion 44 extends a sufficient distance to provide such snug fitting. Vertical portion 43 may extend substantially vertically further upward for the desired distance to provide a support for structural shape 68 and polymeric sheet 70. Sheet metal clip 40 may be provided with substantially horizontal portion 47 to which structural shape 68 is fastened providing uplift resistance and composite structure to the entire deck system. Structural sheet roof support shape 68 may be fastened to clip 40 by any suitable mechanical means, such as self-tapping screws. Likewise, polymeric sheet 70 may be fastened to structural shape 68 by any suitable mechanical means, preferably by plastic capped screws.

Clip 40 is readily inserted at any location into slot 26 by simply turning it so that the axis of the clip and the box section are parallel and inserting the clip for the distance so that slot 42 will engage flanges 24 and 25 and then turning the clip so that axis of the clip is approximately 90° to the axis of the sub-purlin.

The sheet metal clips may be fabricated by well known stamping and bending techniques from sheet metal from about 20 gauge to about 14 gauge. It is preferred to use galvanized, commercial steel of 16 and 18 gauge.

The vertical portion of the clip extending above the box section may be about 1½ to about 4½ inches to accommodate the thickness of various desired formboards and insulation. The vertical portion of the clip extending into the sheet metal box section may be any desired length so as to provide adequate stiffness of the clip when the flanges of the box section are engaged in the opposing slots of the clip. Horizontal portion 44 of the clip extends for a suitable distance to adequately hold the formboard insulation assembly in place, about ½ to about 1 inch being suitable. Vertical portion 43 may extend upward beyond horizontal portion 44 for a suitable distance to provide support for structural shape 68 to which polymeric sheet 70 is fastened. At the upper end of vertical portion 43 may be horizontal portion 47 of suitable length to provide bearing surface for structural shape 68, about ½ to about 1½ inch being suitable. Structural shape 68 may be of any suitable shape which provides flanges for attachment to the upper horizontal portion of clip 40 and for attachment of polymeric sheet 70. Structural sheet metal shapes which are readily made by roll-forming, such as the channel shape shown in FIG. 1, are especially useful for attachment to clips 40 and provide surface for fastening of polymeric sheet 70.

The distance between polymeric sheet 70 and the top of the formboard-insulation assembly may be adjusted to fit particular needs of specific types of roofs. For example, structural shape 68 may be placed directly upon horizontal portion 44 of clip 40 and directly above the formboard-insulation assembly with the polymeric sheet roofing 70 being fastened directly to structural shape 68. In cases, clip 40 would not have a vertical portion extending above horizontal portion 44. When it is desired to utilize the roof construction of this invention for solar energy absorbing roof decks, it may be desired to space structural shape 68 from the upper surface of the formboard-insulation assembly as shown in FIG. 1. Thus, it is seen that this invention applies to both an insulated roof construction wherein a polymeric exterior sheet provides the weather and structural surface as well as roof construction wherein at least a portion of the roof surface provides for solar energy absorption.

One embodiment of the roof deck of this invention for solar energy absorption is shown in FIG. 1 wherein metallic absorber plate 64 providing a "black body" is placed directly above insulation 63. Metallic plate 64 may be a solid absorbing surface having heat transfer pipes 83 in contact with its upper surface so that the solar energy passes through polymeric sheet 70, is absorbed by the surface of sheet 64 acting as a "black body", transferred by conduction to liquid flowing through pipe 83 which, in turn, is connected through riser pipe 82 to pipe 81 which is carried within the box section for distribution to the desired volume to be heated or to supply thermal energy for air conditioning cooling. It is seen that the box section is utilized in this invention, in addition to providing the structural support for the roof, acts as carrier for transfer of the thermal energy from the solar absorber to the volume desired to be heated or cooled. It is also readily apparent that pipes 81, 82 and 83 may be totally eliminated and air from the room or volume to be heated may be circulated directly over absorber plate 64 and passed through box sections 20 and provided directly to the volume to be heated by having slots in the bottom of box section 20. When such an air flow system is utilized, blowers (not shown) must be located at the entrance to or the exit from the roof deck structure.

When a heat transfer liquid is utilized in pipes such as pipe 83 as shown in FIG. 1, it may be desirable to increase the solar energy collection efficiency by utilization of mirror surfaces as shown by parabolic mirror 66. In this case, the direct sun rays are focused through slots 65 directly upon pipe 83.

Figure 2:
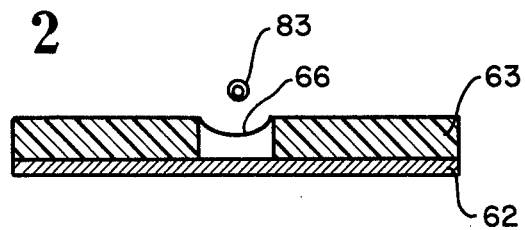
FIG. 2 is a sectional view showing one type of solar energy reflector.
Figure 3:
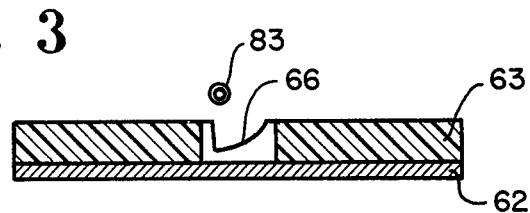
FIG. 3 is a sectional view showing another type of solar energy reflector.
Figure 4:
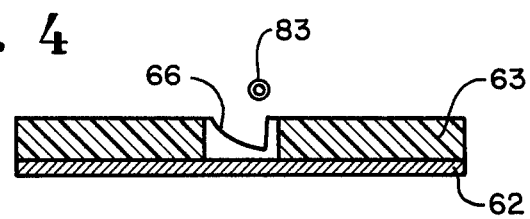
FIG. 4 is a sectional view showing another type of solar energy reflector.
Figure 5:
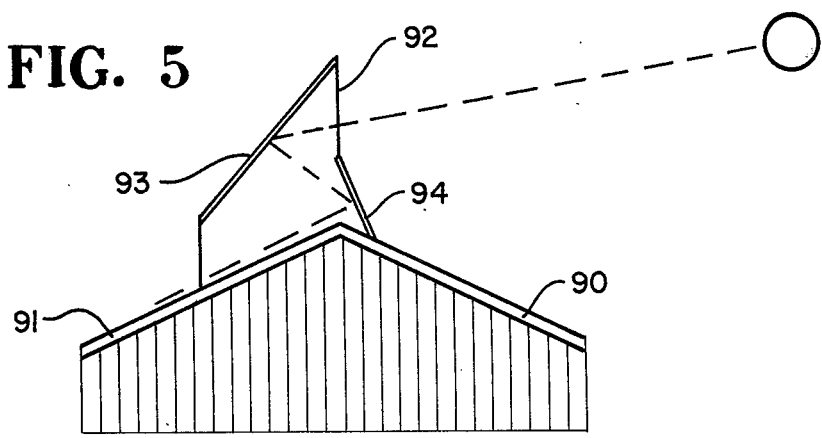
FIG. 5 is a view of a sloping roofing structure with solar energy reflectors according to one preferred embodiment of this invention.

FIGS. 2, 3 and 4 show utilization of different shape parabolic surfaces for concentrating the reflected sun rays upon pipe 83. These are especially useful in sloping roofs and roofs which do not directly face the sun. Likewise, FIG. 5 shows one embodiment of the roof of this invention wherein the portion of the roof sloping toward the north may be utilized for solar energy collection by use of reflectors 93 and 94 providing solar energy absorption in roof surface 91 in a sloping roof away from the sun. In addition, plastic semicircular magnifying sections may be placed directly above pipes 83. These plastic sections may be directly supported by structural shape 68 and having a diameter of about 2 inches.

Any moisture permeable or moisture impervious formboard of a wide variety of sizes may be used in the deck construction of this invention. The structure of this invention allows the use of less expensive water impervious formboard such as felted rock wool materials (such as FESCO board sold by Johns Manville Company). Any gypsum formboard, moisture permeable or moisture impermeable, fiberglass or other conventional formboard material is suitable. Fiberglass formboard provides noise adsorption and seves as a decorative ceiling. Formboard thicknesses of about ¼ inch to about 2 inches are suitable, about ⅜ inch to about ¾ inch being preferred. The sub-purlin system with formboard at right angles to the sub-purlins prevents formboard fall-out and undesired deflection experienced with bulb tee and truss tee systems now used.

Any formboard providing a two hour fire rating when used with poured gypsum slabs is especially suitable. The least expensive of the gypsum formboards, the rigid ½ inch thick gypsum formboard is suitable for use in the roof structure of this invention, however, various surfaced gypsum formboards having suitable ceiling surfaces may be utilized as long as the incombustibility and flame spread ratings are satisfactory. This invention provides a deck structure in which formboard may be used as the lower surface.

The synthetic organic polymer foam may be any substantially rigid organic polymer foam having good insulating properties and preferably a high temperature at which thermal decomposition occurs. Suitable foams include polystyrene, styrene-maleic anhydride, phenolic, such as phenol formaldehyde, polyurethane, vinyl, such as polyvinyl chloride and copolymers of polyvinyl chloride and polyvinyl acetate, epoxy, polyethylene, urea formaldehyde, acrylic, polisocyanurate and the like. Preferred foams are selected from the group consisting of polystyrene and polyurethane. Particularly suitable foams are closed cell foams which provide high insulating properties and low internal permeability to moisture. Such organic polymer foams are substantially rigid bodies of foam and are well known for their low density and outstanding thermal insulating properties. The foam is preferably in board form and may be utilized in sheets of any workable size. It is preferred to have the foam board at right angles to the formboard to minimize seam exposure. Any thickness providing desired insulation is suitable, about 1 inch to about 6 inches being preferred and about 1 inch to about 3 inches being especially preferred.

The gypsum formboard-foam structure as disclosed in my pending application Ser. No. 457,996, may advantageously be used in the roof structure of this invention, permitting complete flexibility with respect to sub-purlin spacing. The insulating foam may also have formboard over its upper surface making a formboard-foam-formboard sandwich structure for increased fire resistance. The foam may be attached to the formboard in any suitable manner: by mechanical fasteners such as staples, by adhesives, or by foaming in place upon the gypsum board. Further, the deck construction of this invention eliminates the need for grouting as shown in my above identified copending applications and provides for full, continuous insulation.

The synthetic polymeric sheet roofing material for use in this invention may be any polymeric material which provides for desired structural strength and retention of such properties without appreciable degradation from sunlight and weather. The polymeric sheet is both the structural component of the integrated deck construction system of this invention and the weather surface. For the embodiments of this invention utilizing solar energy absorption, it is desired that the polymeric sheet maximize the passage of the solar energy to the collecting means located beneath it. Any polymeric material meeting the above standards is suitable.

One particularly suitable thermoplastic corrugated sheet material is biaxially oriented corrugated polyvinyl chloride sheets. The biaxially oriented polyvinyl chloride sheets maintain good mechanical properties and light transmission property with sustained exposure to ultraviolet light and weathering. Further, the impact strength of the biaxially oriented polyvinyl chloride corrugated sheets is high and permits use of such sheet polymeric material as the structural component of roof decks. A particularly suitable biaxially oriented polyvinyl chloride corrugated sheet material is currently offered by Solvay and Cie SA, Brussels, Belgium, under the trade name Selchim HR. The production of these biaxially oriented polyvinyl chlorides is set forth in more detail in U.S. Pat. Nos. 3,661,994, 3,744,952, United Kingdom Pat. Nos. 1,353,447 and 1,365,041. Such materials are available permitting passage of the solar energy downward through the polymeric sheet roofing to the solar collectors or in various opaque colors which reflect the solar energy to enhance the insulation properties of the roof deck.

The combination of the roof deck of this invention is advantageous since the box sections provide the structural support for the roof, a raceway for solar energy transfer pipes, or as direct ducts for passing air through a solar energy absorption system. The roof deck construction of this invention further provides a lightweight, insulated structural deck of corrugated plastic whereby utilization of the clips results in an integrated deck construction. The roof deck of this invention weights less than one-half the presently used lightweight roof deck structure. The roof deck of this construction provides for collection of solar energy over the entire deck surface and eliminates the requirement of special support structures for solar energy collectors. The deck construction of this invention is suitable for use in either flat or sloping deck roof construction. Skylights may be placed at any desired position in the roof structure of this invention by omitting the formboard-insulation assembly over the desired skylight area and does not require any framing around such a skylight.

Any suitable ceiling structure ceiling structure may be installed beneath the deck structure of this invention. However, in contrast to prior roof structures, it is not necessary that the ceiling provide the insulation or fireproofing qualities. The roof structure of this invention provides high insulation and fireproof properties without any structure beneath it and may be left exposed.

While in the foregoing specifications this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:
1. A synthetic polymeric surface roof deck structure comprising the combination:
    structural purlins;
    sub-purlins of sheet metal structural shapes of a box section having a horizontal base, opposing vertical sides and upper horizontal flanges extending inwardly from the top of said sides forming an open slot between the terminus of said flanges, said sub-purlins at right angles to and said base resting on top of said purlins;
    formboard adjacent to and secured against the top of said upper horizontal flanges of said sub-purlins and insulating synthetic organic polymer foam on top of said formboard making a formboard-foam assembly;
    sheet metal clips having a vertical portion extending upwardly and downwardly from opposing slots, each of said opposing slots engaging one of said horizontal flanges of said box section when the aixs of said clip and box section are at about 90° to each other, said upwardly extending vertical portion bending to a horizontal portion to engage the top of said formboard-foam assembly securing the formboard against the top of said flanges;
    structural sheet roof support shapes fastened to the top of said clips; and
    structural polymeric sheet roofing fastened to said support shapes forming the structural sheet and weather surface of said roof deck structure and with said clips and box sections providing a composite structure.
2. The roof deck structure of claim 1 wherein said formboard is selected from the group consisting of felted rock wool materials, moisture permeable gypsum, moisture impermeable gypsum and fiberglass.
3. The roof deck structure of claim 2 wherein said formboard is gypsum formboard.
4. The roof deck structure of claim 1 wherein said foam is about 1 inch to about 6 inches thick.
5. The roof deck structure of claim 4 wherein said foam is selected from the group consisting of polystyrene, styrene-maleic anhydride, phenolic, such as phenol formaldehyde, polyurethane, vinyl, such as polyvinyl chloride and copolymers of polyvinyl chloride and polyvinyl acetate, epoxy, polyethylene, urea, formaldehyde, acrylic and polyisocyanurate.
6. The roof deck structure of claim 5 wherein said foam is selected from the group consisting of polystyrene and polyurethane.
7. The roof deck structure of claim 1 wherein said structural polymeric sheet roofing is biaxially oriented polyvinyl chloride.
8. The roof deck structure of claim 1 wherein a solar energy absorber plate is adjacent the top of said foam to absorb solar energy passing through said polymeric sheet roofing.
9. The roof deck structure of claim 8 wherein pipes carrying a heat transfer liquid are adjacent said solar energy absorber plate transferring said energy to said liquid by contact of said pipes with said absorber plate.
10. The roof deck structure of claim 9 additionally having solar energy reflecting surfaces beneath slots in said absorber plate over which said pipes are located to concentrate said energy in the region of said pipes.

* * * * *